United States Patent [19]

EerNisse et al.

[11] Patent Number: 4,592,663
[45] Date of Patent: Jun. 3, 1986

[54] RESONATOR TEMPERATURE TRANSDUCER

[75] Inventors: Errol P. EerNisse, Sandy; Robert B. Wiggins, West Valley City, both of Utah

[73] Assignee: Quartex, Inc., Salt Lake City, Utah

[21] Appl. No.: 608,857

[22] Filed: May 10, 1984

[51] Int. Cl.$^4$ ............................................. G01K 11/22
[52] U.S. Cl. ..................................... 374/117; 310/370
[58] Field of Search .................... 374/117, 118, 119; 73/579; 310/370, 367

[56] References Cited

U.S. PATENT DOCUMENTS

| | | | |
|---|---|---|---|
| 3,946,257 | 3/1976 | Kawamura | 310/370 |
| 4,069,434 | 1/1978 | Kawai et al. | 310/370 |
| 4,377,765 | 3/1983 | Kogure et al. | 310/370 |
| 4,379,244 | 4/1983 | Dinger | 310/370 |
| 4,437,773 | 3/1984 | Dinger et al. | 374/117 |
| 4,453,105 | 6/1984 | Kogure | 310/370 |
| 4,459,042 | 7/1984 | Paros | 374/117 |
| 4,472,655 | 9/1984 | Kawashima | 374/117 |
| 4,503,353 | 3/1985 | Hermann | 310/370 |

*Primary Examiner*—Robert I. Smith
*Assistant Examiner*—David R. Schuster
*Attorney, Agent, or Firm*—Thorpe, North & Western

[57] ABSTRACT

A vibratory temperature transducer includes a pair of elongate, generally parallel bars coupled together at one end in a type of tuning fork arrangement. The bars each have a thickness of t, a width of w and a length between free and fixed ends of L. The distance between the free end and the point where the bars are coupled together is m. Apparatus is provided to cause the bars to vibrate in torsional opposition, where the frequency of vibration is generally a function of temperature. Apparatus is also provided for determining the frequency of vibration of the bars so that when the bars are subjected to a change in temperature, the temperature can be readily determined by simply determining the magnitude of the frequency change. By careful determination of the dimensions L, m, t and w, spurious modes of oscillation of the transducer, which cause a reduction in the mechanical Q and thus an erroneous reading of temperature, are avoided.

14 Claims, 6 Drawing Figures

RESONATOR TEMPERATURE TRANSDUCER

BACKGROUND OF THE INVENTION

This invention relates to a vibratory transducer for measuring temperature, where the dimensions of the transducer are selected to avoid spurious modes of operation and thus provide accurate temperature readings over a wide range.

Double bar transducer elements formed in the shape of tuning forks have been proposed for a variety of uses including use as an accelerometer element (U.S. Pat. No. 3,238,789), use as a force transducer (U.S. Pat. No. 4,372,173), and use as a temperature sensor (U.S. Pat. No. 4,437,773). In the last mentioned patent, a so-called quartz thermometer utilizes the torsional mode of vibration (each tine rotates about its own longitudinal axis 180° and out of phase with the other tine) to measure temperature changes. It is noted in the patent that by proper orientation of the axes of the quartz crystal used in the tuning fork—length of the tuning fork is arranged to be generally parallel to the X axis, among other things—the torsional mode frequency will change with temperature. Thus, by measuring change in the frequency of vibration, a measure of temperature change can be made.

It has been discovered that with the dimensions given in U.S. Pat. No. 4,437,773, for the tuning fork (resonator) there disclosed, a number of spurious modes of operation develop over the operational range of the device and these spurious modes result in a lowering of the mechanical Q of the device, a shift in frequency, and a possible cessation of oscillation at the desired natural resonant frequency. The cause of this anomalous behavior is that at certain frequencies, the torsional mode frequency coincides with the frequency of another vibrational mode. The coincidence of modes allows some of the electrical energy driving the desired mode to be diverted into the spurious mode resulting in an abrupt shift in frequency or cessation of oscillation, either of which renders the resonator useless as a temperature sensor.

Some of the spurious modes include (1) flexure or oscillation of the bars (tines) in phase in a direction normal to the plane of the resonator or transducer ($f_p$), (2) flexure or oscillation of the bars 180° out of phase in a direction normal to the plane of the transducer ($f_w$) (3) oscillation in phase in the plane of the transducer ($f_b$), and (4) oscillation out of phase in the plane ($f_a$). In addition to the fundamental frequencies of these spurious modes there are also overtone frequencies which can likewise cause problems. These spurious modes may be excited by the pumping motion of the structure resulting from the bars flexing, by the piezoelectric effect (assuming piezoelectric material is used) if the structure's geometry is poorly chosen, and by the nonlinear elastic behavior of the transducer material. The existence of these spurious modes of operation has not been recognized in the past in torsional mode tuning forks.

Another factor to be considered for torsional mode temperature transducers is the need for configurations which will allow use of photolithography and chemical etching for fabrication. Such fabrication techniques provide cost advantages, miniaturization and tight dimensional control.

SUMMARY OF THE INVENTION

It is an object of the invention to provide a resonator temperature transducer which is accurate over a wide range of temperatures.

It is a further object of the invention to provide such a transducer which is relatively easy to fabricate.

It is also an object of the invention to provide such a transducer which is constructed to facilitate ease of fixing in place for use.

It is still another object of the invention to provide such a transducer constructed to minimize the possibility of certain spurious modes of oscillation.

The above and other objects of the invention are realized in a specific illustrative embodiment of a resonator temperature transducer which includes a pair of elongate, generally parallel and spaced apart bars made of a piezoelectric material and coupled together at one end in the form of a tuning fork. The thickness of each of the bars is t, the width is w, and the length between the free and fixed ends is L. The distance from the free end to the point at which the bars are connected is m. The dimensions t, w, L, and m are selected so that certain spurious modes of operation may be avoided. In particular, avoidance of these modes requires careful selection of the values of ratios t/w, m/w, and L/m.

BRIEF DESCRIPTION OF THE DRAWINGS

The above and other objects, features and advantages of the invention will become apparent from a consideration of the following detailed description presented in connection with the accompanying drawings in which:

FIGS. 2 through 6 is a chart showing the range of values useable for t/w and m/w for fixed L/m ratios for operation of exemplary transducers free from spurious modes.

DETAILED DESCRIPTION

Figure 1:
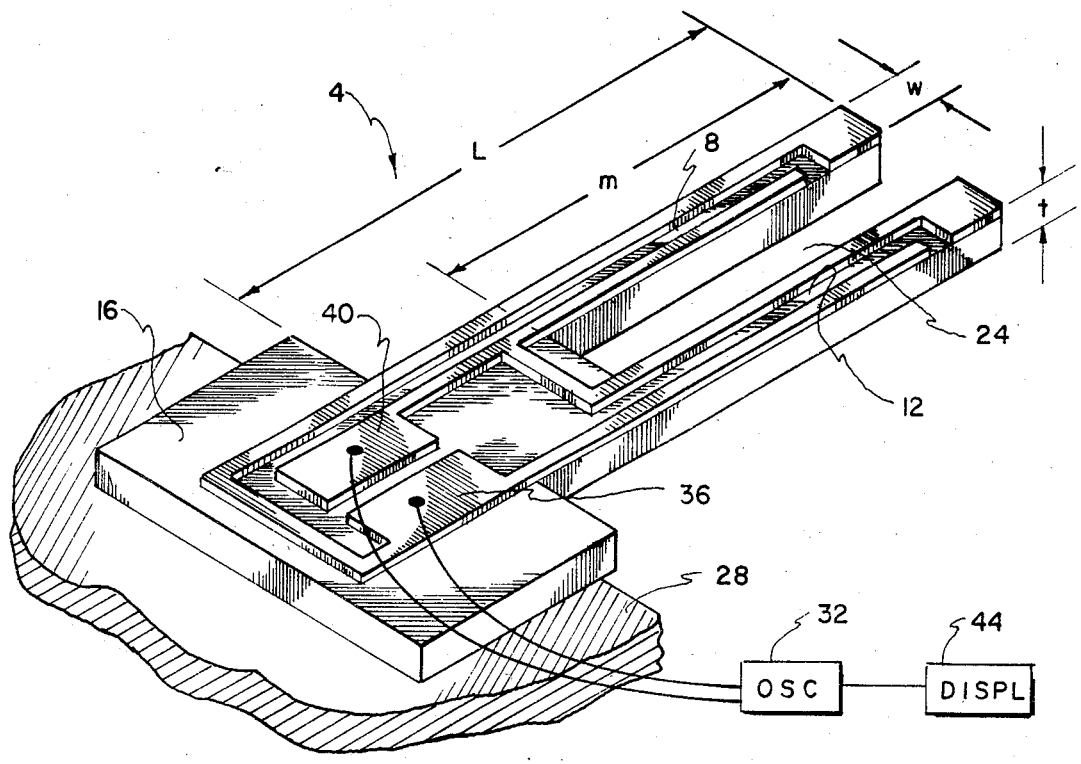
FIG. 1 shows a perspective view of a torsional mode vibratory force transducer made in accordance with the principles of the present invention.

FIG. 1 shows a double-bar vibratory transducer 4 composed of a pair of generally parallel bars 8 and 12 coupled together at one end and joined to a significantly enlarged or widened mounting end portion 16. A slot separates the two bars 8 and 12. The widened end portion 16 is used for mounting the transducer on suitable support structure 28. Advantageously, the transducer is made of a piezoelectric material such as quartz, with the crystallographic axes of the material being oriented so that the torsional mode frequency of vibration of the transducer will change with temperature. (Such orientation is discussed in U.S. Pat. No. 4,437,773.)

The various dimensions of the transducer are labeled in the drawing, with t representing the thickness of the bars, w representing the width of the bars, L representing the length of the bars from the fixed end to the free ends (i.e., in FIG. 1 the distance between the significantly enlarged mounting portion 16 and the free end), and m representing the length of the slot. The width of the portion between the fixed end and the point where the two bars are joined is generally equal to 2 w plus the slot width, but can be wider by as much as w without significantly affecting the spurious mode frequencies described herein. Exemplary values and ranges of values for these dimensions will be given later.

An oscillator circuit 32 is coupled to thin electrode films or coatings 36 and 40 disposed on various surfaces of the transducer 4 as shown in the drawing. (The placement of the electrode films to obtain torsional mode vibration is discussed further in U.S. Pat. No. 4,437,773.) Application of A.C. signals by the oscillator 32 to the electrode films 36 and 40 produces stress forces in the bars 8 and 12 to cause the bars to vibrate in a torsional motion in 180° phase opposition. That is, the bars 8 and 12 are caused to alternately twist in a well known manner and at a characteristic or desired natural resonant frequency.

When the transducer 4 is subjected to a change in temperature, the frequency of vibration of the bars is caused to change, and the magnitude of the change serves as a measure of the temperature change. The oscillator 32 follows in frequency the frequency of the transducer and so the change in frequency of the transducer can be measured by simply measuring the output frequency of the oscillator. A conventional counter and display 44 may be connected to the oscillator 32 to provide a read out of the temperature.

The significantly enlarged mounting portion 16 of the transducer 4 is provided to give certainty to the location of the fixed ends, i.e., to the dimension L, regardless of the locations at which the end of the transducer is bonded or otherwise fixed to support structure. Without the enlarged end portion 16, the dimension L could vary from one device to another since L would then be measured from the edge of the attachment joint to the free ends. Since it is difficult to mount (attach) consistently to the same location each time a device is used, consistency and preciseness in the dimension L would be hard to achieve. For reasons to be discussed later, it is important that the dimensions of the transducer 4, including the dimension L, be carefully selected and maintained to avoid certain undesirable modes of operation.

Before describing specific illustrative dimensions of applicant's invention some of the principles governing the operation of torsional mode vibratory transducers will be discussed.

It has been discovered, as earlier discussed, that certain spurious modes of oscillation may develop in a double-bar torsional mode vibratory transducer. These modes are (1) flexure or oscillation of the bars in a direction normal to the plane of the transducer and in phase ($f_{pn}$), and (2) flexure of the bars in a direction normal to the plane, but out of phase ($f_{wn}$), (3) oscillation in the plane of the transducer with the bars in phase ($f_{bn}$), and oscillation in the plane with the bars out of phase ($f_{an}$), where n indicates the nth order mode. When the desired natural resonant frequency equals the frequency or twice the frequency of oscillation of these spurious modes, the mechanical Q of the transducer is dramatically descreased because acoustic energy is transferred to the undesired mode which pulls down the desired resonant frequency, and thus any reading of temperature is either non-existent or incorrect. It is thus desirable to construct the transducer so that these spurious modes are avoided, i.e., so that the desired natural or characteristic frequency (or multiples thereof) of the transducer do not equal the spurious mode resonant frequencies.

The desired resonant or characteristic frequency f for a double-bar torsional mode transducer constructed in accordance with the structure shown in the drawings is given to close approximation by:

$$f_T = \frac{Z\, t/w}{m\sqrt{1 + \frac{t^2}{w^2}}\sqrt{1 + \frac{S_{55}}{S_{66}} \cdot \frac{t^2}{w^2}}}, \quad (1)$$

where $S_{55}$ and $S_{66}$ are the shear compliances in the device planes tm (plane coinciding with the length m and thickness t), and wm (plane coinciding with the length m and width w), and where Z is derived from the density P and shear compliance $S_{66}$ of the material. It should be noted that the magnitude of Z varies with temperature because the density and shear compliance $S_{66}$ vary with temperature which contributes the main part of the temperature dependence of $f_T$, the phenomenon used here to measure temperature. Z is equal to $G\sqrt{1/PS_{66}}$, with G being a constant of proportionality independent of temperature and determinable by experiment as explained hereinafter. The material parameters $S_{55}$ and $S_{66}$ change with crystallographic orientation if crystalline material is used.

The resonant frequencies of the spurious modes of oscillation of the transducer have been determined by experimental and theoretical examination to be as follows:

$$f_{an} = A_{an}\frac{wK}{m^2}, \quad (2)$$

$$f_{bn} = A_{bn}\frac{wK}{L^2\sqrt{1 + \frac{m}{L}}}, \quad (3)$$

$$f_{pn} = A_{pn}\frac{tK}{L^2}, \quad (4)$$

$$f_{wn} = A_{wn}\frac{tK}{m^2\sqrt{1 + \frac{L}{m}}}, \quad (5)$$

where various values of n designate the order of the mode (fundamental and harmonic resonances), where $$K = \frac{1}{2\pi}\sqrt{E/12P}$$

and where E is Young's modulus and P is the density of the material, and where the values L, m, t, and w are dimensions described above. The various values for A given below were experimentally determined:

| | |
|---|---|
| $A_{a1} = 3.05$ | $A_{b1} = 8.57$ |
| $A_{a2} = 18.99$ | $A_{b2} = 41.82$ |
| $A_{a3} = 51.92$ | $A_{b3} = 96.97$ |
| $A_{p1} = 3.91$ | $A_{w1} = 4.96$ |
| $A_{p2} = 22.12$ | $A_{w2} = 30.91$ |
| $A_{p3} = 59.09$ | $A_{w3} = 71.82$ |
| $A_{p4} = 114.1$ | $A_{w4} = 89.80$ |
| $A_{p5} = 189.9$ | $A_{w5} = 143.4$ |
| $A_{p6} = 281.8$ | $A_{w6} = 180.8$ |

These values were the only values which come into play over the practical range of dimensions plotted in FIGS. 2 through 6 and of interest in this invention. These values were obtained by measuring the resonant frequencies for the modes $f_a$, $f_b$, $f_p$ and $f_w$, including overtones, on tuning fork quartz resonators constructed to vibrate in each of the modes indicated. From these measured frequencies, the known values of E and P for the crystallographic orientation used, and the known dimensions t, w, m, and L, the emperical values for A were determined by solving each of the equations (2) through (5). The constant G which figures in the determination of Z (equation (1)), can be determined in a similar fashion by measuring the resonant frequency for the torsional mode $f_T$, and solving equation (1). The value was found to be G=0.45.

In order to avoid the spurious modes, the dimensions of the transducer will be selected so that the desired characteristic resonant frequency $f_T$ for the torsional mode does not equal one or two times the spurious mode resonant frequencies anywhere in the desired operating range. That is, the dimensions will be selected so that the following inequalities hold:

$$\frac{f_T}{f_{an}} = \frac{Z \frac{t}{w} \frac{m}{w}}{A_{an} CDK} \neq 1 \text{ or } 2, \quad (6)$$

$$\frac{f_T}{f_{pn}} = \frac{Z \frac{L^2}{m^2} \frac{m}{w}}{A_{pn} CDK} \neq 1 \text{ or } 2, \quad (7)$$

$$\frac{f_T}{f_{bn}} = \frac{Z \frac{t}{w} \frac{L^2}{m^2} \frac{m}{w} \sqrt{1 + \frac{1}{L/m}}}{A_{bn} CDK} \neq 1 \text{ or } 2, \quad (8)$$

$$\frac{f_T}{f_{wn}} = \frac{Z \frac{m}{w} \sqrt{1 + \frac{L}{m}}}{A_{wn} CDK} \neq 1 \text{ or } 2, \quad (9)$$

where $$C = \sqrt{1 + \frac{t^2}{w^2}}, \quad D = \sqrt{1 + \frac{S_{55}}{S_{66}} \cdot \frac{t^2}{w^2}}$$

If one chooses to use quartz, the value Z varies by about 2% to 3% over the temperature ranges withstandable by the quartz material.

FIGS. 2 through 6 show plots of t/w and m/w for specific values of L/m, and for a Z-cut quartz plate, where the shaded regions represent values of t/w and m/w which will lead to a spurious mode occurring at some temperature. The specific spurious modes represented by the shaded regions are identified in FIG. 5. The clear regions represent values of t/w and m/w which will give a transducer operable free of spurious modes for all temperatures within the useful range of the crystalline quartz. The change in Z with temperature causes the inequalities to sweep out regions in the m/w vs. t/w plat for fixed L/m and this is the reason for the "smeared" shaded areas shown in the drawings.

One illustrative set of values for t/w, L/m and m/w for a Z-cut quartz plate for which all the inequalities hold are as follows:

t/w=0.33

L/m=1.4 m/w=13

With these ratios (shown by a square 51 in FIG. 5), the identified spurious modes are avoided. Other possible allowable ratios are indicated by the clear areas in the graphs of FIGS. 2-6, as already mentioned.

Figure 2:
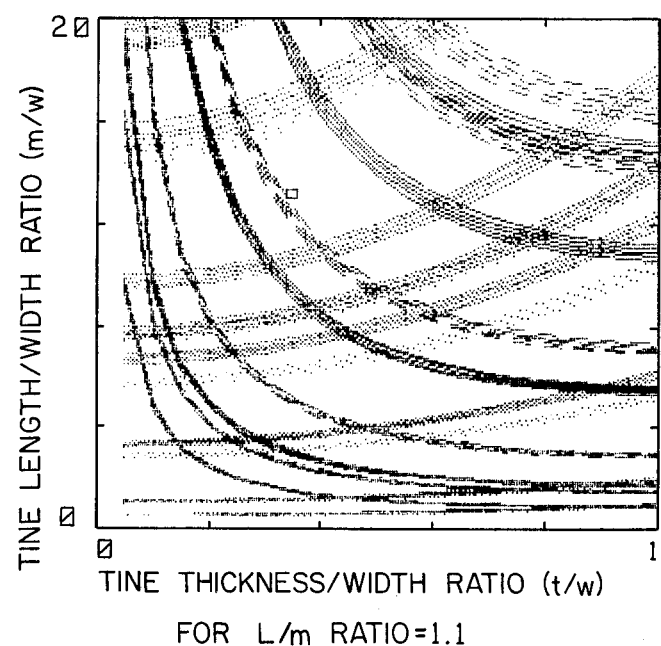
Figure 3:
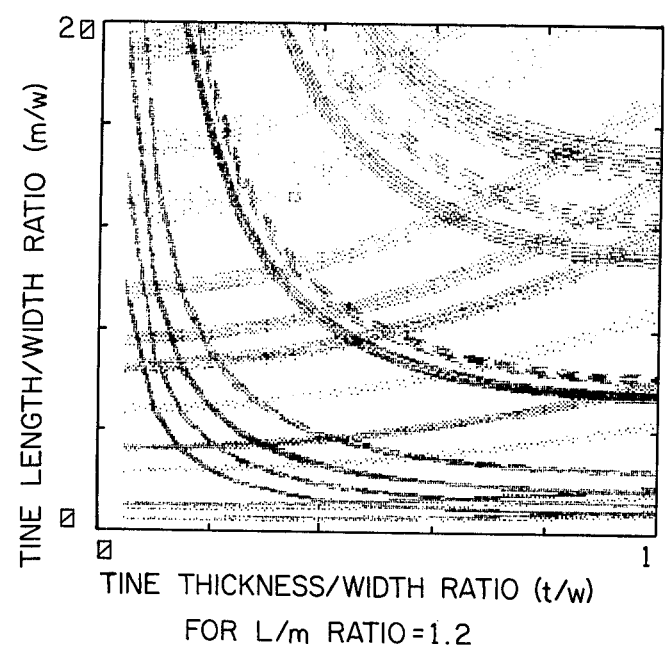
Figure 4:
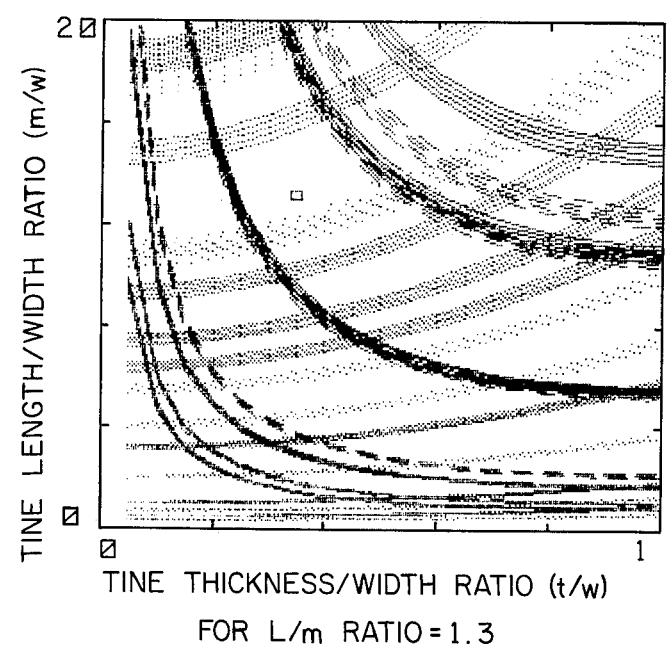

The square 51 in each of the FIGS. 2-6 represents transducer dimensions which satisfy the following:

t/w=0.33 and m/w=13. It can be seen that for these ratios, together with the ratios L/m=1.3 (FIG. 4) and L/m=1.4 (FIG. 5), the square lies safely in clear areas away from spurious mode areas, indicating that transducers having dimensions which satisfy these ratios would operate free of the spurious modes. In FIGS. 2, 3, and 6, the square lies either in or near spurious mode areas, indicating that transducers having dimensions which satisfy the ratios of these FIGS. might be affected by spurious modes.

It has been found that for ratios of L/m greater than 1.5, the spurious mode regions become more densely packed making it more difficult to locate large clear areas of operation free from the spurious modes. The reason for the greater density of spurious mode areas is because of the higher order harmonics of the spurious modes appearing in the range of ratios shown in the graphs. In addition, for ratios of L/m greater than 1.5, the tines or bars would be quite far removed from the enlarged mounting section 16 (FIG. 1) and thus the resonator would be bulkier than necessary and more susceptible to breaking. For these reasons, it has been found advantageous to limit resonator dimensions so that $1.1 \leq L/m \leq 1.5$. The lower limit simply requires that some difference between L and m be maintained to achieve proper tuning fork operation.

Because the lines on the graphs of FIGS. 2-6 defining spurious modes of vibration are "smeared" due to variation of the value of Z with temperature (as earlier discussed), it is advantageous to select transducer dimensions which will place the transducer in the "clear" areas of the graphs at some distance from the spurious shaded areas to ensure error free operation. Thus, selecting the transducer dimensions so that the ratios $f_T/f_{an}$, $f_T/f_{pn}$, $f_T/f_{bn}$ and $f_T/f_{wn}$ do not approach within about three percent of equaling one or two accomplishes this.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A resonator temperature transducer comprising
a pair of elongate, spaced-apart, generally parallel bars coupled together at one end, said bars each having a thickness t and width w, with the distance from the location at which the bars are coupled together to the free ends of the bars being m, and said bars being made of a material so that when the bars are caused to vibrate in the torsional mode, the frequency of vibration varies as a function of temperature,
an enlarged mounting section formed integral with the bars at said one end, with the distance from the mounting section to the free ends of the bar being L,
means for causing said bars to vibrate in the torsional mode 180° out of phase at a frequency $f_T$, and wherein t, w, m and L are selected so that $$\frac{f_T}{f_{an}} = \frac{Z \frac{t}{w} \frac{m}{w}}{A_{an} CDK} \neq 1$$

-continued $$\frac{f_T}{f_{pn}} = \frac{Z \frac{L^2}{m^2} \frac{m}{w}}{A_{pn} CDK} \neq 1$$

$$\frac{f_T}{f_{bn}} = \frac{Z \frac{t}{w} \frac{L^2}{m^2} \frac{m}{w} \sqrt{1 + \frac{1}{L/m}}}{A_{bn} CDK} \neq 1$$

$$\frac{f_T}{f_{wn}} = \frac{Z \frac{m}{w} \sqrt{1 + \frac{L}{m}}}{A_{wn} CDK} \neq 1$$

where
$A_{an}$=3.05, 18.99, 51.92 for n=1, 2 and 3
$A_{bn}$=8.57, 41.82, 96.97 for n=1, 2 and 3
$A_{pn}$=3.91, 22.12, 59.09, 114.1, 189.9, 281.8 for n=1, 2, 3, 4, 5 and 6
$A_{wn}$=4.96, 30.91, 71.82, 89.80, 143.4, 180.8 for n=1, 2, 3, 4, 5 and 6

$$C = \sqrt{1 + t^2/w^2}$$

$$D = \sqrt{1 + \frac{S_{55}}{S_{66}} \cdot \frac{t^2}{w^2}}$$

$$K = \frac{1}{2\pi} \sqrt{E/12P}$$

$$G = 0.45$$

$$Z = G\sqrt{1/S_{66} \cdot P}$$

$f_{an}$, $f_{pn}$, $f_{bn}$ and $f_{wn}$ are the frequencies of vibration of spurious modes of the transducer, where n is the order of the mode, P is the density of the material and $S_{55}$ and $S_{66}$ are shear compliances and E is Young's Modulus of the material.

2. A resonator temperature transducer as in claim 1 wherein t, w, m and L are further selected so that $f_T/f_{an} \neq 2$ $f_T/f_{pn} \neq 2$ $f_T/f_{bn} \neq 2$, and $f_T/f_{wn} \neq 2$.

3. A resonator temperature transducer as in claim 2 wherein m and L are further selected so that $1.1 \leq L/m \leq 1.5$.

4. A resonator temperature transducer as in claim 3 wherein t, w, m and L are further selected so that $0.1 \leq t/w \leq 1$, and $4 \leq m/w \leq 25$.

5. A resonator temperature transducer as in claim 2 wherein said vibration causing means includes an oscillator means which provides an oscillatory signal which follows the frequency of vibration of the bars.

6. A resonator temperature transducer as in claim 5 further comprising means coupled to said oscillator means and responsive to the oscillatory signal for providing a read out of the temperature indicated by the frequency of vibration of the bars.

7. Resonator temperature measuring apparatus comprising
a pair of elongate, spaced-apart generally parallel bars coupled together at one end, each having a thickness t and width w, with the distance from the location at which the bars are coupled together to the free ends of the bars being m, said bars comprised of piezoelectric material with the crystallographic axes oriented such that when the bars are stimulated to vibrate in the torsional mode 180 degrees out of phase, the frequency of vibration varies as a function of the temperature to which the bars are exposed,
a support structure to which the joined ends of the bars are attached, where the distance from the support structure to the free ends of the bars is L,
electrodes placed on the bars and responsive to oscillatory signals for causing the bars to resonate in the torsional mode 180 degress out of phase,
means for applying oscillatory signals to said electrodes to cause the bars to resonate in the torsional mode at a frequency $f_T$,
means for producing an oscillatory signal having frequencies which follow the frequency of vibration of the bars, and
wherein t, w, m and L are selected so that the following representations do not approach within about three percent of equaling one or two:

$$\frac{f_T}{f_{an}} = \frac{Z \frac{t}{w} \frac{m}{w}}{A_{an} CDK},$$

$$\frac{f_T}{f_{pn}} = \frac{Z \frac{L^2}{m^2} \frac{m}{w}}{A_{pn} CDK},$$

$$\frac{f_T}{f_{bn}} = \frac{Z \frac{t}{w} \frac{L^2}{m^2} \frac{m}{w} \sqrt{1 + \frac{1}{L/m}}}{A_{bn} CDK},$$

$$\frac{f_T}{f_{wn}} = \frac{Z \frac{m}{w} \sqrt{1 + \frac{L}{m}}}{A_{wn} CDK},$$

where
$A_{an}$=3.05, 18.99, 51.92 for n=1, 2 and 3
$A_{bn}$=8.57, 41.82, 96.97 for n=1, 2 and 3
$A_{pn}$=3.91, 22.12, 59.09, 114.1, 189.9, 281.8 for n=1, 2, 3, 4, 5 and 6
$A_{wn}$=4.96, 30.91, 71.82, 89.80, 143.4, 180.8 for n=1, 2, 3, 4, 5 and 6

$$C = \sqrt{1 + t^2/w^2}$$

$$D = \sqrt{1 + \frac{S_{55}}{S_{66}} \cdot \frac{t^2}{w^2}}$$

$$K = \frac{1}{2\pi} \sqrt{E/12P}$$

$$G = 0.45$$

$$Z = G\sqrt{1/S_{66} \cdot P}$$

$f_{an}$, $f_{pn}$, $f_{bn}$ and $f_{wn}$ are the frequencies of vibration of spurious modes of the transducer, where n is the order of the mode, P is the density of the material and $S_{55}$ and $S_{66}$ are shear compliances and E is Young's Modulus of the material.

8. Apparatus as in claim 7 wherein said bars include an enlarged mounting section at the end where the bars are joined, and where the distance from the mounting section to the free ends of the bars is L.

9. Apparatus as in claim 8 wherein L and m are selected so that $1.1 \leq L/m \leq 1.5$.

10. A resonator temperature transducer comprising
a pair of elongated, generally parallel bars coupled together at one end, said bars each having a thickness t and width w, with the distance from the location at which the bars are coupled together to the free ends of the bars being m, and said bars being made of quartz crystal with the crystallographic axes oriented so that when the bars are caused to vibrate in the torsional mode, the frequency of vibration varies as a function of temperature,
an enlarged mounting section joined to the bars at said one end, with the distance from the mounting section to the free ends of the bars being L,
means for causing said bars to vibrate in the torsional mode 180° out of phase at a frequency $f_T$, and
wherein t, w, m and L are selected so that $$0.2 \leq t/w \leq 0.5,$$

$$10 \leq m/w \leq 16$$

$$1.35 \leq L/m \leq 1.45, \text{ and}$$

$$f_T/f_{p4} \neq 1, \ f_T/f_{a2} \neq 1, \ f_T/f_{w5} \neq 1,$$

where $$f_{p4} = (114.1) \frac{tK}{L^2},$$

$$f_{a2} = (18.99) \frac{wK}{m^2},$$

$$f_{w5} = (143.4) \frac{tK}{m^2} \sqrt{1 + \frac{L}{m}},$$

$$K = \frac{1}{2} \sqrt{E/12P},$$

E is Young's Modulus of the material, and P is the density of the material.

11. A resonator temperature transducer as in claim 10 wherein t, w, m, and L are further selected so that $$f_T/f_{p3} \neq 2, \ f_T/f_{b2} \neq 2, \ f_T/f_{w3} \neq 2,$$

where $$f_{p3} = (59.09) \frac{tK}{L^2},$$

$$f_{b2} = (41.82) \frac{wK}{L^2 \sqrt{1 + \frac{m}{L}}}, \text{ and}$$

$$f_{w5} = (71.82) \frac{tK}{m^2 \sqrt{1 + \frac{L}{m}}}.$$

12. The resonator temperature transducer comprising
a pair of elongated, generally parallel bars coupled together at one end, said bars each having a thickness t and width w, with the distance from the location at which the bars are coupled together to the free ends of the bars being m, and said bars being made of quartz crystal with the crystallographic axes oriented so that when the bars are caused to vibrate in the torsional mode, the frequency of vibration varies as a function of temperature,
an enlarged mounting section joined to the bars at said one end, with the distance from the mounting section to the free ends of the bars being L,
means for causing said bars to vibrate in the torsional mode 180° out of phase at a frequency $f_T$, and
wherein t, w, m and L are selected so that $$0.4 \leq t/w \leq 0.8,$$

$$12 \leq m/w \leq 18,$$

$$1.35 \leq L/m \leq 1.45, \text{ and}$$

$$f_T/f_{p4} \neq 1, \ f_T/f_{a3} \neq 1, \ f_T/f_{b3} \neq 1,$$

where $$f_{p4} = (114.1) \frac{tK}{L^2},$$

$$f_{a3} = (51.92) \frac{wK}{m^2},$$

$$f_{b3} = (96.97) \frac{wK}{L^2 \sqrt{1 + \frac{m}{L}}},$$

$$K = \frac{1}{2\pi} \sqrt{E/12P},$$

E is Young's Modulus of the material, and P is the density of the material.

13. A resonator temperature transducer as in claim 12 wherein t, w, m, and L are further limited so that $$f_T/f_{p3} \neq 2, \ f_T/f_{w5} \neq 1, \ f_T/f_{w3} \neq 2,$$

where $$f_{p3} = (59.09) \frac{tK}{L^2},$$

$$f_{w5} = (143.4) \frac{tK}{m^2 \sqrt{1 + \frac{L}{m}}}, \text{ and}$$

$$f_{w3} = (71.82) \frac{tK}{m^2 \sqrt{1 + \frac{L}{m}}}.$$

14. Resonator temperature measuring apparatus comprising
a pair of elongate, spaced-apart, generally parallel bars coupled together at one end, said bars each having a thickness t and width w, with the distance from the location at which the bars are coupled together to the free ends of the bars being m, said bars comprised of a piezoelectric material with the crystallographic axes oriented so that when the bars are caused to vibrate in the torsional mode, the frequency of vibration varies as a function of temperature, an enlarged mounting section formed integral with the bars at said one end, with the distance from the mounting section to the free ends of the bars being L, means for causing said bars to vibrate in the torsional mode 180° out of phase at a frequency $f_T$, means for providing an indication of the frequency of vibration of th bars, wherein t, w, m and L are selected so that the following ratios do not approach with about three percent of equaling one or two:

$f_T/f_{an}$, $f_T/f_{pn}$, $f_T/f_{bn}$, and $f_T/f_{wn}$, and wherein m and L are further selected so that $1.1 \leq L/m \leq 1.5$, where $$\frac{f_T}{f_{an}} = \frac{Z \frac{t}{w} \frac{m}{w}}{A_{an} CDK},$$

$$\frac{f_T}{f_{pn}} = \frac{Z \frac{L^2}{m^2} \frac{m}{w}}{A_{pn} CDK},$$

$$\frac{f_T}{f_{bn}} = \frac{Z \frac{t}{w} \frac{L^2}{m^2} \frac{m}{w} \sqrt{1 + \frac{1}{L/m}}}{A_{bn} CDK},$$

$$\frac{f_T}{f_{wn}} = \frac{Z \frac{m}{w} \sqrt{1 + \frac{L}{m}}}{A_{wn} CDK},$$

$A_{an}$=3.05, 18.99, 51.92 for n=1, 2 and 3
$A_{bn}$=8.57, 41.82, 96.97 for n=1, 2 and 3
$A_{pn}$=3.91, 22.12, 59.09, 114.1, 189.9, 281.8 for n=1, 2, 3, 4, 5 and 6
$A_{wn}$=4.96, 30.91, 71.82, 89.80, 143.4, 180.8 for n=1, 2, 3, 4, 5 and 6

$$C = \sqrt{1 + t^2/w^2}$$

$$D = \sqrt{1 + \frac{S_{55}}{S_{66}} \cdot \frac{t^2}{w^2}}$$

$$K = \frac{1}{2\pi} \sqrt{E/12P}$$

$$G = 0.45$$

$$Z = G\sqrt{1/S_{66} \cdot P}$$

$f_{an}$, $f_{pn}$, $f_{bn}$ and $f_{wn}$ are the frequencies of vibration of spurious modes of the transducer, where n is the order of the mode, P is the density of the material and $S_{55}$ and $S_{66}$ are shear compliances and E is Young's Modulus of the material.

* * * * *